(12) United States Patent
Kaneyoshi

(10) Patent No.: US 6,458,196 B2
(45) Date of Patent: Oct. 1, 2002

(54) CONDUCTIVE FILLER

(75) Inventor: Masami Kaneyoshi, Takefu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 12 days.

(21) Appl. No.: 09/800,923

(22) Filed: Mar. 8, 2001

(30) Foreign Application Priority Data

Mar. 8, 2000 (JP) ........................................ 2000-063085

(51) Int. Cl.$^7$ ................................................. C09C 1/36
(52) U.S. Cl. ........................ 106/440; 106/480; 523/204; 524/440
(58) Field of Search ........................ 106/440; 523/204; 524/440

(56) References Cited

U.S. PATENT DOCUMENTS 5,116,664 A * 5/1992 Kimura ...................... 428/216

* cited by examiner

*Primary Examiner*—Paul R. Michl
(74) *Attorney, Agent, or Firm*—Birch, Stewart, Kolasch & Birch, LLP

(57) ABSTRACT

A conductive filler in the form of non-conductive particles coated with plural layers of metal plating is provided wherein the lower layer is of copper or copper alloy plating, and the uppermost layer is of gold plating. The conductive powder has a high conductivity, improved durability, especially oxidation resistance, and a relatively low specific gravity.

8 Claims, No Drawings

CONDUCTIVE FILLER

This invention relates to a conductive filler which is blended in rubber and resin compositions for imparting electrical conductivity.

BACKGROUND OF THE INVENTION

It is known in the art that molded rubber parts as a whole can be made electrically conductive by blending a powder of conductive particles in rubber compositions, typically silicone rubber compositions and molding. Such conductive rubber parts are used in antistatic applications. The traditional conductive powder is carbon black. In recent years, conductive molded rubber parts are sometimes used for electrical connection on circuit boards in electronic equipment. In this application, high conductivity is required from the antistatic standpoint. More conductive additives, typically metal powders are then used as the conductive agent. The metal powders, however, have the problems that they are susceptible to ignition during handling and are readily oxidized to detract from conductivity, and most of them have a high specific gravity.

To overcome these shortcomings, it was recently developed to metallize core particles of resin or ceramic material. A typical powder takes the form of core particles which are coated with nickel by electroless plating and further on the outermost surface with gold by displacement plating. The coating of gold on the outermost surface cooperates with the underlying nickel to provide conductivity and oxidation resistance. The specific gravity is low since the metallization is limited to the surface. The cost is acceptable because of the thin buildup of gold.

Nevertheless, the conductivity of nickel/gold plated particles is insufficient in some applications or purposes. This is partly because the underlying nickel layer is usually a nickel-phosphorus alloy which has a high resistivity. It is thus desired to improve the conductivity of conductive particles (resulting from electroless plating) without a significant increase of material cost.

SUMMARY OF THE INVENTION

An object of the invention is to provide a conductive filler having a high conductivity, improved durability, especially oxidation resistance, and a relatively low specific gravity.

According to the invention, a layer of copper or copper alloy plating is formed on surfaces of non-conductive particles, a layer of nickel or nickel alloy plating is optionally formed thereon, and a layer of gold plating is formed as the uppermost layer. The resulting conductive particulate filler has a low resistivity, improved durability, and a lower specific gravity than wholly metal particles.

DESCRIPTION OF THE PREFERRED EMBODIMENT

The electrically conductive filler of the invention is in the form of non-conductive particles or core particles which are coated on their surface with plural layers of metal plating. A lower layer of metal plating is formed of copper or copper alloy plating, and the uppermost layer of metal plating is formed of gold plating. Preferably a layer of nickel or nickel alloy plating intervenes between the lower layer of copper or copper alloy plating and the uppermost layer of gold plating. The intermediate layer prevents the gold plating layer from diffusing into the copper or copper alloy plating layer to form an alloy when heated.

The core material used herein to construct the non-conductive particles to be coated with metallizing layers is selected from a wide variety of materials including oxides such as silicon oxide, aluminum oxide, titanium oxide, zirconia, rare earth oxides, and yttrium oxide, naturally occurring compounds such as mica and diatomaceous earth, glasses such as sodium silicate glass, resins such as polyurethane, polycarbonate, phenolic resin, polyamide, polyimide, silicone resin, epoxy resin and polystyrene, and other electrically insulating materials. In a typical application, 100 parts by weight of a rubber composition, typically a silicone rubber composition or a resin composition, typically an epoxy resin composition is loaded with about 80 to 500 parts by weight of the inventive conductive filler, and the blend is milled prior to use. In order to prevent the plating from being stripped from the core particles during the milling step, the core particles should preferably have a certain rigidity. In this sense, an inorganic core material, especially silicon oxide is preferred. Core particles in excess of 150 $\mu$m should desirably be excluded because they are likely to separate from the rubber or resin matrix even after milling. More desirably core particles in excess of 100 $\mu$m are excluded. It is preferable to use core particles having a diameter of up to 150 $\mu$m, more preferably up to 100 $\mu$m, and most preferably 5 to 50 $\mu$m. A particle shape more approximate to sphere is generally preferable. Particles of nearly spherical shape are most preferred since they are uniformly dispersed during milling.

Formed on surfaces of core particles is a layer of copper or copper alloy plating. The layer of copper or copper alloy plating is preferably formed by electroless or chemical plating.

Since the core particles are of insulating material, a catalyst must be applied thereto for initiating electroless plating. Catalyzing is carried out by prior art well-known methods, for example, a method of immersing in a tin (II) chloride solution and then in a palladium (II) chloride solution, and a method of immersing in a mixed solution of tin chloride and palladium chloride. To facilitate the application of catalyst, the core particles can be subjected to suitable treatments, for example, brief etching with suitable chemical agents, such as strong alkalis, mineral acids or chromic acid, treatment with chemical agents possessing both a functional group having affinity to the catalytic metal and a functional group having affinity to the core particles, such as silane coupling agents having an amino group, and mechanical treatments such as plasma treatment.

The electroless copper plating solution used for forming the copper or copper alloy plating layer may be any of well-known compositions, and commercially available compositions are acceptable. The plating conditions may be well-known ones. The electroless copper plating solution generally uses formaldehyde as a reducing agent although the use of hypophosphites and borides as the reducing agent is acceptable.

The copper or copper alloy plating layer is preferably formed of substantially pure copper. By the term "substantially pure," it is meant that copper may contain a minor amount of other elements as impurities. Preferably the copper or copper alloy plating layer has a thickness of 50 to 500 nm, and more preferably 75 to 400 nm. With a thickness below 50 nm, the metallized particle powder may become less conductive. A thickness in excess of 500 nm may not be cost effective since it brings about little further advantages and adds to the expense of metal material.

On core particles of a particular type, the adhesion of electroless copper plating is weak, as compared with electroless nickel plating, so that it may be strippable. In such a situation, another electroless plating layer other than copper or copper alloy may be formed as a primer layer underlying the copper or copper alloy plating layer.

The conductive filler of the invention is characterized in that a layer of copper or copper alloy plating is formed as the lower layer of metal plating (as mentioned just above) and a layer of gold plating is formed as the uppermost layer. To augment the adhesion of the gold plating layer to the copper or copper alloy plating layer, the copper or copper alloy plating layer is preferably surface processed. The surface processing may be done by any of plating treatment, blasting and plasma treatment although it is preferred to form an intermediate plating layer because replacement gold plating on copper proceeds at a very slow reaction rate and often ceases to proceed. In the event of copper being in direct contact with gold, there is a likelihood of interdiffusion between copper and gold to form an alloy when heat is applied during the step of molding the rubber or resin compound after milling. The diffusion and alloying can adversely affect the desired oxidation resistance. To prevent the undesired interdiffusion as well, it is recommended that a layer of nickel or nickel alloy plating intervene as an intermediate layer.

As the intermediate layer, a layer of nickel or nickel base alloy such as pure nickel, nickel-boron, nickel-phosphorus or nickel-boron-phosphorus is formed. Of these, a nickel-phosphorus alloy (phosphorus content 2 to 14% by weight) is most preferable because of ease of electroless nickel plating itself and uniform progress of subsequent replacement gold plating. The nickel salt for the electroless nickel plating may be any of well-known ones such as nickel sulfate, nickel chloride and nickel acetate, and used in a concentration of 0.01 to 0.5 mol/l of the plating bath. Too high a nickel concentration may allow a hydroxide to form due to pH changes and changes in the concentration of complexing agent, leading to a shortened bath life. At too low a nickel concentration, a more amount of solution must be replenished to bring about a substantial change of the plating bath volume. The phosphorus reducing agent used is hypophosphorous acid or an alkali metal or ammonium salt thereof, preferably in an amount of 0.1 to 5 mol per mol of the nickel salt.

Preferably the intermediate layer has a thickness of 15 to 200 nm, and more preferably 25 to 150 nm. With a thickness below 15 nm, the effects of the intermediate layer to facilitate replacement gold plating and prevent interdiffusion between gold and copper may become insufficient. Since the intermediate layer has little contribution to conductivity, a thickness in excess of 200 nm may merely increase the specific gravity of the power and the raw material cost.

The uppermost layer of gold plating should preferably have a thickness of at least 7 nm when the size and shape of particles, the gold content by chemical analysis, the constituents of the remaining plating layers and the specific gravity of core particles are taken into account. Below 7 nm, a continuous and dense gold film enough to provide oxidation resistance may not be obtained. The more preferred thickness is from 10 nm to 30 nm. A gold layer of more than 30 nm results in an increased specific gravity and an increased cost. It is not critical how to form the gold layer. Either electroless plating or electroplating may be used although the formation of the gold layer by replacement gold plating is preferred.

With respect to replacement gold plating, since the object to be plated is a powder rather than a large size molded part, it is preferred from the safety and hygienic standpoint to use gold (I) sulfite complex ions instead of gold cyanide complex ions which are customarily used in the prior art. The solvent for the gold salt is selected from water, ketones, and alcohols. The gold salt is preferably added in a concentration of 0.01 to 20% by weight.

It is not critical how to form the respective plating layers. The plating method is selected from several methods, for example, a method of premixing a metal ion, reducing agent, complexing agent, buffer agent, etc. to form a plating solution, adjusting the pH and temperature thereof, and directly admitting a powder into the plating solution; a method of admitting a slurry of a powder in water into the plating solution; and a method of dispersing a powder in a solution containing some plating solution components, and adding the remaining plating solution components thereto. The composition of plating solution may be selected from conventional bath compositions known for electroless nickel alloy plating, electroless copper plating and replacement gold plating.

The thus obtained conductive filler preferably has a resistivity of up to 15 m$\Omega$-cm, more preferably 0.1 to 10 m$\Omega$-cm, and most preferably 0.1 to 5 m$\Omega$-cm. For the measurement of resistivity (or conductivity), specifically the measurement of resistance of a sample having a standardized volume and shape, constant current potentiometric measurement is conducted by the so-called four terminal method. Since the resistance to be measured is very low, a contact resistance and a thermally induced potential difference between contacts can be non-negligible error factors. It is thus desirable to minimize such error factors and compensate therefor by alternately inverting the current flow.

The conductive filler is advantageously used in various rubber and resin compositions, typically silicone rubber compositions and epoxy resin compositions.

EXAMPLE

Examples of the invention are given below by way of illustration and not by way of limitation.

Example

After 30 g of a spherical silicon oxide powder having a mean particle size of about 10 $\mu$m (Silica Ace US-10 by Mitsubishi Rayon Co., Ltd.) was weighed, it was added to 180 cm$^3$ of an aqueous solution of 0.3 g aminoalkylsilane coupling agent (KBM603 by Shin-Etsu Chemical Co., Ltd.). After 30 minutes of agitation at room temperature, the powder was filtered on a Buchner funnel, and washed by spraying a small amount of water.

The silane coupling agent-treated powder was added to 150 cm$^3$ of an aqueous solution containing 3 mmol/dm$^3$ of palladium chloride, 0.05 mol/dm$^3$ of tin (II) chloride and 2.5 mol/dm$^3$ of hydrogen chloride, followed by 10 minutes of agitation. The powder was separated from the mixture by filtration on a Buchner funnel. The powder was washed by spraying 150 cm$^3$ of dilute hydrochloric acid having a concentration of 1 mol/dm$^3$ and further with 100 cm$^3$ of water.

Next the catalyzed powder was dispersed in 135 cm$^3$ of water by agitation, forming a slurry. Separately, 4 dm$^3$ of a plating solution was furnished by dissolving 0.039 mol/dm$^3$ of copper (II) sulfate, 0.024 mol/dm$^3$ of disodium ethylenediamine tetraacetate and 0.096 mol/dm$^3$ of formaldehyde in water, adding an aqueous sodium hydroxide solution thereto for adjusting to pH 12.9 and heating at a temperature of 42° C. With stirring, the slurry was added to this plating solution. While stirring was continued, reaction took place for 15 minutes, depositing an electroless copper plating film as the lower layer. At the end of reaction, the powder was separated by filtration on a Buchner funnel and washed by spraying about 1 dm$^3$ of water. Immediately thereafter, the powder was dispersed in 135 cm$^3$ of water by agitation, forming a slurry.

There was furnished 3 dm$^3$ of a plating solution by dissolving 0.042 mol/dm$^3$ of nickel sulfate, 0.084 mol/dm$^3$ of sodium hypophosphite and 0.05 mol/dm$^3$ of citric acid in water, adding aqueous ammonia thereto for adjusting to pH 8.8 and heating at a temperature of 45° C. The slurry of the copper plated powder was added to this plating solution. While stirring was continued, reaction took place for 15 minutes, depositing an electroless nickel-phosphorus alloy plating film as the intermediate layer. At the end of reaction, the powder was separated by filtration on a Buchner funnel and washed by spraying about 1 dm$^3$ of hydrochloric acid having a concentration of 0.6 mol/dm$^3$ and then about 1 dm$^3$ of water. Immediately thereafter, the powder was dispersed in 135 cm$^3$ of water by agitation, forming a slurry.

There was furnished 1.4 dm$^3$ of a plating solution by dissolving 0.011 mol/dm$^3$ of sodium gold (I) sulfite (chemical formula: $Na_3Au(SO_3)_2$), 0.1 mol/dm$^3$ of sodium sulfite and 0.1 mol/dm$^3$ of malonic acid in water, adjusting to pH 7.2 and heating at a temperature of 65° C. The slurry of the nickel plated powder was added to this plating solution. While stirring was continued, reaction took place for 10 minutes, depositing a replacement gold plating film as the uppermost layer. At the end of reaction, the powder was separated by filtration on a Buchner funnel and washed by spraying about 1 dm$^3$ of water. The powder was recoated and dried for 3 hours in air at 60° C. in a blowing dryer.

A sample of the powder was completely decomposed using hydrofluoric acid and aqua regia. Chemical analysis demonstrated a composition (% by weight): 59.3% of $SiO_2$, 21.2% of Cu, 11.6% of Ni, 6.94% of Au, and 0.92% of P. A resistivity of 1.7 mΩ-cm was computed from the resistance measured by the four terminal method (using SMU-257 current source by Keithley, 1 to 10 mA, and Model 2000 Nanovolt Meter by Keithley). The true density was 3.06 g/cm$^3$. A sample of the powder was heat treated in air at 250° C. for one hour before its resistance was measured, finding a resistivity of 1.8 mΩ-cm, which was substantially unchanged from the initial. An x-ray diffraction pattern of the heat treated powder demonstrated that gold had not diffused.

Comparative Example

The same spherical silicon oxide powder as used in Example was catalyzed by the same procedure as in Example. The catalyzed powder was dispersed in 135 cm$^3$ of water by agitation, forming a slurry. There was furnished 4 dm$^3$ of a plating solution by dissolving 0.072 mol/dm$^3$ of nickel sulfate, 0.144 mol/dm$^3$ of sodium hypophosphite and 0.08 mol/dm$^3$ of citric acid in water, adding aqueous ammonia thereto for adjusting to pH 8.8 and heating at a temperature of 45° C. The slurry of the catalyzed powder was added to this plating solution. While stirring was continued, reaction took place for 20 minutes, depositing an electroless nickel-phosphorus alloy plating film. At the end of reaction, the powder was separated by filtration on a Buchner funnel and washed by spraying about 1 dm$^3$ of hydrochloric acid having a concentration of 0.6 mol/dm$^3$ and then about 1 dm$^3$ of water. Immediately thereafter, the powder was dispersed in 135 cm$^3$ of water by agitation, forming a slurry. Thereafter, replacement gold plating was carried out on the powder as in Example, followed by filtration, water washing and drying.

A sample of the powder was completely decomposed using hydrofluoric acid and aqua regia. Chemical analysis demonstrated a composition (% by weight): 58.5% of $SiO_2$, 32.4% of Ni, 6.84% of Au, and 2.26% of P. A resistivity of 7.5 mΩ-cm was computed from the resistance measured by the four terminal method. The true density was 3.08 g/cm$^3$.

Between Example and Comparative Example, the content and thickness of gold and the total metal buildup are approximately equal, and the specific gravity is approximately equal. The resistivity of Example is significantly lower than that of Comparative Example.

In order to inspect the effect of the intermediate layer, gold was deposited on a copper plate to a thickness of about 20 nm by magnetron sputtering. This sample was heat treated in air at 250° C. for one hour as in Example. An x-ray diffraction pattern of the heat treated sample demonstrated that gold and copper had diffused to form an alloy. It is understood that the presence of the intermediate layer in Example restrains the diffusion of gold.

There has been described a conductive particle powder having a high conductivity, improved durability, especially oxidation resistance, and a relatively low specific gravity, which is useful as a filler in the industry.

Japanese Patent Application No. 2000-063085 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A conductive filler comprising non-conductive particles which are coated on their surface with plural layers of metal plating, wherein a lower layer of metal plating is formed of copper or copper alloy plating, and the uppermost layer of metal plating is formed of gold plating.

2. The conductive filler of claim 1 wherein a layer of nickel or nickel alloy plating intervenes between the layer of copper or copper alloy plating and the layer of gold plating.

3. The conductive filler of claim 1 wherein the non-conductive particles are selected from the group consisting of silicon oxide, aluminum oxide, titanium oxide, zirconia, rare earth oxides, yttrium oxide, mica, diatomaceous earth, sodium silicate glass, polyurethane, polystyrene, polycarbonate, phenolic resin, polyamide, polyimide, silicone resin and epoxy resin.

4. The conductive filler of claim 1 wherein the non-conductive particles are of silicon oxide.

5. The conductive filler of claim 1 wherein the layer of copper or copper alloy plating is formed by electroless plating.

6. The conductive filler of claim 1 wherein the non-conductive particles have a diameter of up to 150 μm, and the layer of copper or copper alloy plating has a thickness of 50 to 500 nm.

7. The conductive filler of claim 6 wherein the layer of gold plating has a thickness of at least 7 nm.

8. The conductive filler of claim 6 wherein the layer of gold plating has a thickness of at least 7 nm, and a layer of nickel or nickel alloy plating having a thickness of 15 to 200 nm is interposed as an intermediate layer between the layer of copper or copper alloy plating and the layer of gold plating.

* * * * *